United States Patent Office 3,407,597
Patented Oct. 29, 1968

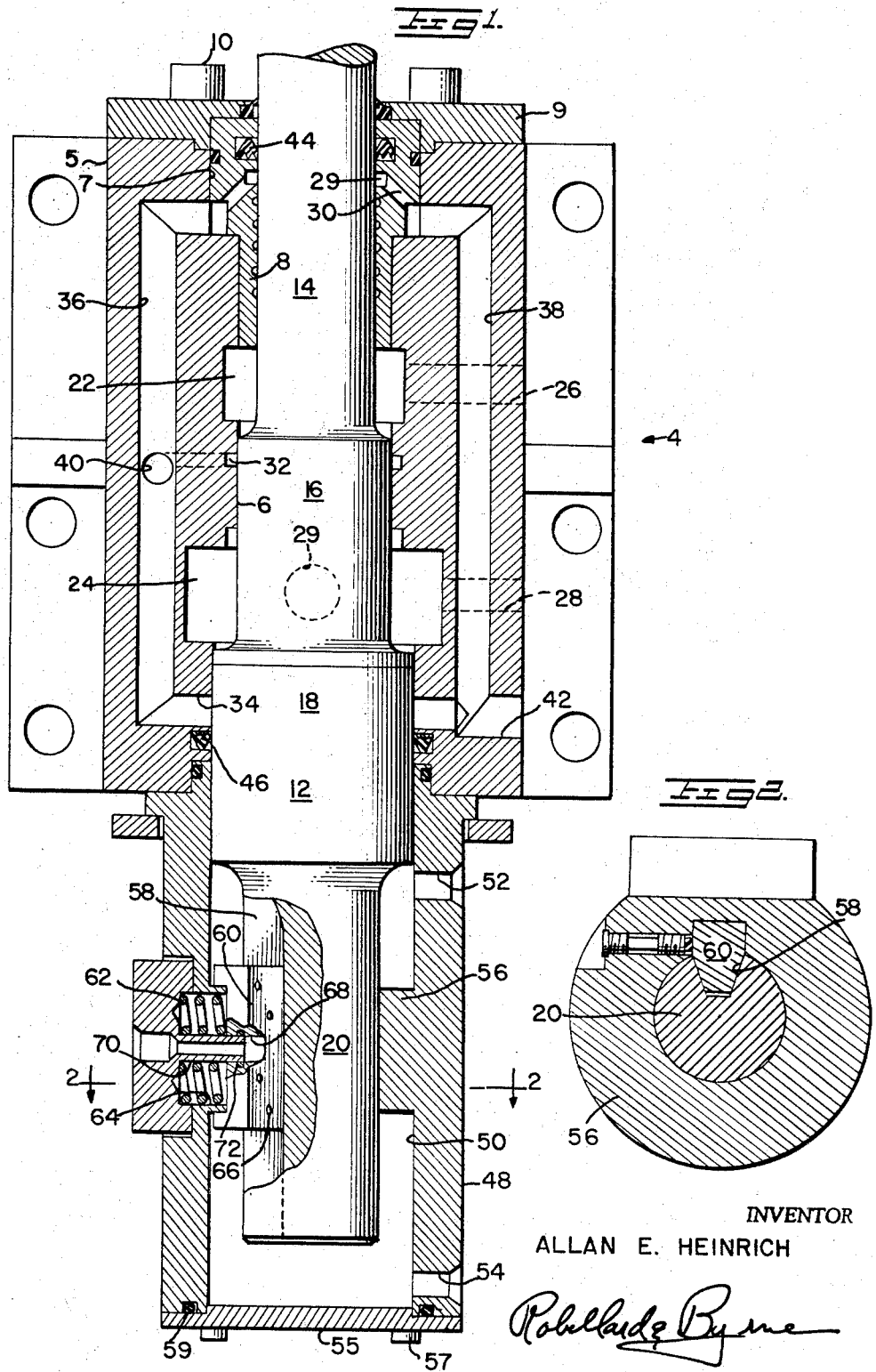

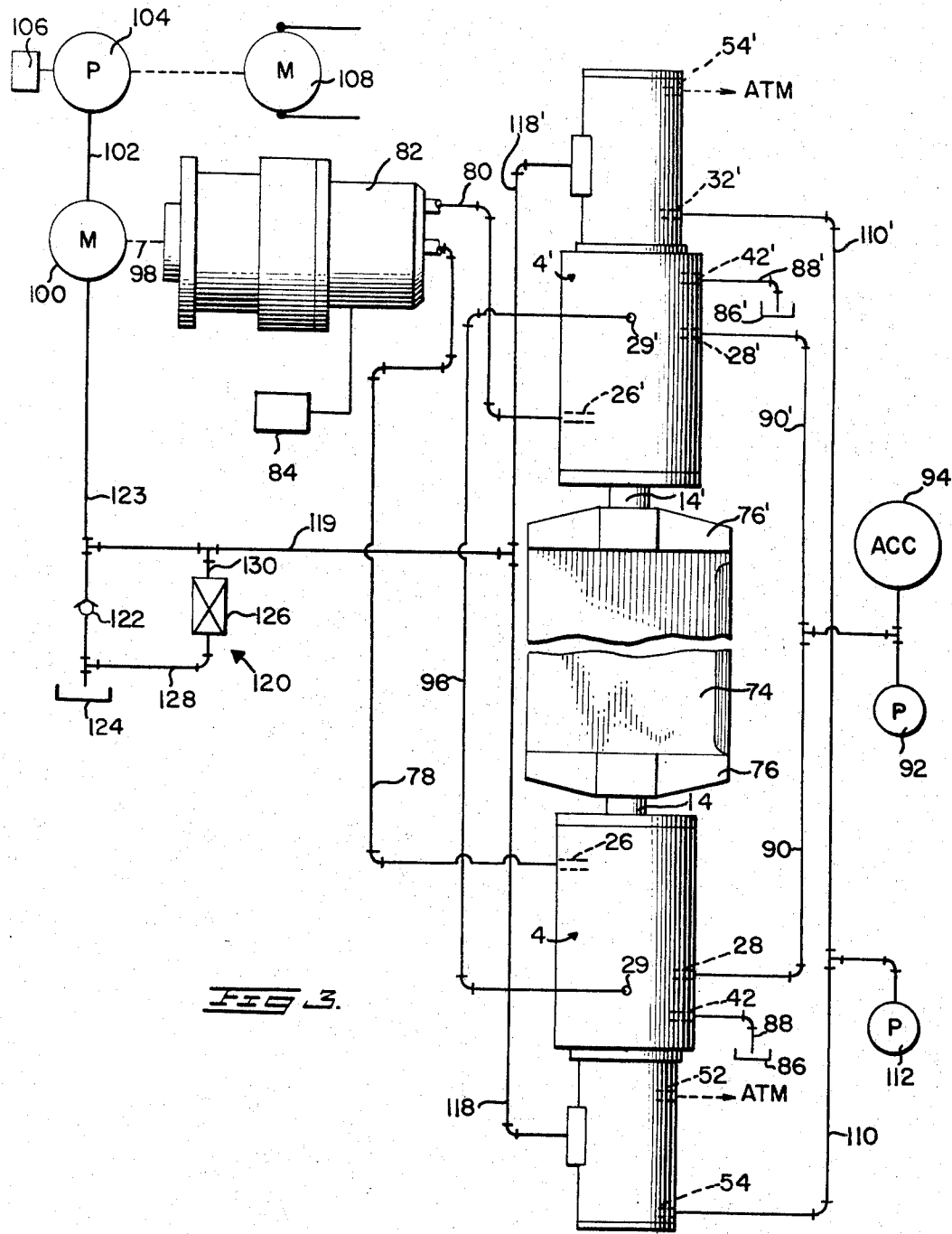

3,407,597
VIBRATOR ASSEMBLY
Allan E. Heinrich, Oconomowoc, Wis., assignor to Applied Power Industries, Inc., Menomonee Falls, Wis., a corporation of Wisconsin
Filed Sept. 6, 1966, Ser. No. 577,465
6 Claims. (Cl. 60—52)

ABSTRACT OF THE DISCLOSURE

A device for reciprocating a member including first and second drive means connected to opposite sides of the member, the drive means being alternately actuated to apply an outwardly directed force to each end of the member, and fluid pressure means connected to each end of the member for applying a constant outwardly directed force to both ends thereof.

---

This invention relates generally to an apparatus for reciprocating or vibrating a member and more particularly to a device for hydraulically reciprocating or vibrating a relatively flexible member under substantially constant tension at very high frequency.

The device to which this invention pertains provides synchronized hydraulic reciprocating means for driving elongated flexible members such, for example, as material cutting knives, saws and the like. In utilizing flexible members for cutting material it is important that the member be maintained in a state of constant tension regardless of the driving and/or inertial forces imposed on the member. In prior art devices, this means was generally accomplished by providing a mechanical link between opposite ends of the relatively flexible member which linkage could be adjusted to impose the required tension.

This invention utilizes a modified reciprocatory drive device of the type disclosed in United States Patent No. 3,115,751, issued Dec. 31, 1963, to Hugh T. McGee, and provides improvement in that device to make it applicable to high-frequency reciprocation or vibration of elongated, relatively flexible members. In the above-referred-to patent, a reciprocating piston is connected, in direct fluid communication, with separate, synchronized sources of positive fluid pressure, such, for example, as with opposite sides of a positive displacement hydraulic pump. That device is particularly intended for use with a multi-flow hydraulic pump wherein one output portion of the pumping unit is directly connected to one side of the piston with the remaining output portion of the pumping unit connected directly to the other side of the piston which thereby provides a closed circuit of fluid between the pump and the piston thereby timing and locking in phase the reciprocatory motion of the piston with the pumping and suction strokes of the pump. The structure disclosed in the aforementioned patent is not suitable for accomplishing the objects of this invention since, in the contemplated reciprocation of a flexible member, forces must be applied to the member in tension from either end thereof and means must be provided to maintain the member under a constant tension, regardless of the driving and intertial forces imposed on the member. This tensioning must be present to eliminate undesirable transverse flexing, bowing and/or vibrations in the cutting member.

In the particular device to which this invention is directed, reciprocation of the flexible member is accomplished by a pair of opposed hydraulic piston-cylinder combinations operating synchronously to provide reciprocation of the member. It is, therefore, an object of this invention to furnish means for tensioning a reciprocating, relatively flexible member in the system described by furnishing a hydraulic interlink between the ends of the member, which link acts independently of the drive means.

It is yet another object of this invention to provide a hydraulic device for constantly pretensioning a reciprocating elongated member by furnishing an independent pressurizing system which incorporates means to maintain a constant total volume of the pressurizing system.

It is still another object of this invention to furnish means to provide a constant volume in a pair of hydraulic pretensioning cylinders by intercommunicating the cylinders independently of the drive stystem therefor.

These and other objects of this invention will become better understood to those skilled in the art by reference to the following detailed description when viewed in light of the accompanying drawings wherein like elements throughout the figures thereof are indicated by like numerals and wherein;

FIGURE 1 is an elevational view partially in section of a hydraulic reciprocating drive device in accordance with the invention;

FIGURE 2 is a sectional view of a device of FIGURE 1 taken along the lines 2—2 thereof; and FIGURE 3 is a diagrammatic-schematic view of a system incorporating the device of FIGURE 1.

Referring now to FIGURES 1 and 2 of the drawings, the drive device 4 comprises a housing 5 which has a bore 6 extending therethrough. A counterbore 7 is provided at one end of the bore 6, which counterbore encloses a bearing 8 fixed therein by an end cap 9 secured to the housing 5 by bolts 10. A two-stage reciprocating piston shown generally at 12 is mounted in the bore 6 and is formed to comprise, in series, an actuator rod segment 14 extending from one end of the housing 5 through the bearing 8, a drive piston segment 16, a pretensioning piston segment 18, and a piston follower segment 20. The piston 12 is configured to form a slidingly sealing fit in the bore 6 and defines, with the bore, a drive chamber 22 around the forward face of the drive piston segment 16 and a pretensioning chamber 24 around the forward face of the pretensioning piston segment 18. The drive chamber 22 and the pretensioning chamber 24 are connected to taps in the exterior surface of the housing 5 by passages 26 and 28 respectively in the housing 10. The pretensioning chamber 24 is also connected to a tap in the peripheral surface of the housing by a passage 29.

The rod segment 14 is slidably mounted in the bearing 8 for support during reciprocatory movement thereof. The bearing is designed to permit some degree of leakage from the drive chamber 22 therepast to provide lubrication for the sliding surfaces thereof. Leakage also occurs in a similar fashion from the pretensioning chamber 24 past a pretensioning piston segment 18. This leakage is collected and disposed of through a scavenging system which comprises forward, intermeditae and rearward pickups comprised of the slot 30, the slot 32, and the slot 34. The slot 30 is disposed through the bearing 8 while the slots 32 and 34 surround the drive piston segment 16 and the pretensioning piston segment 18 respectively. These pickups are manifolded, through longitudinal passages 36 and 38 of the housing 5 and transverse the passages 40 and 42 to taps in the periphery of the housing 5. The relatively movable portions of the aforedescribed structure are sealed at the forward and rearward portions thereof by annular forward and rearward elastomeric seals 44 and 46.

A secondary housing 48 is attached to the end of the housing 5, and encloses the piston follower segment 20 and defines a piston follower chamber 50 therewith.

Chamber 50 communicates with first and second taps in the housing 48 through first and second passages 52 and 54 respectively. A cover 55 is connected to the end of the housing 48 by bolts 57 sealing therebetween being accomplished by an O ring 59 disposed in an annular slot in the transverse end face of the housing 48. The piston follower chamber 50, which is a machining relief to permit the mounting of instrumentation for measuring frequency and pressure, is divided into first and second sections by an inwardly extending flange 56 which is in sliding engagement with the piston follower segment, around a substantial portion of the periphery thereof. The piston follower segment 20 is provided with a tapered longitudinal slot 58 therein, aligned with the discontinuity in the flange 56. This slot receives a correspondingly tapered key 60, fixed longitudinally but transversely movable with respect to the housing 48. The key and slot prevent the piston from rotating with respect to the housings.

A pair of coil compression springs 62, disposed in a pair of transversely extending bores 64 in the housing 48, bias the key 60 into sliding contact with the tapered surfaces of the slot 58. A plurality of orifices 66, in the tapered surface of the key 60, communicate with a passage 68 in the key which passage, in turn, receives a conduit 70, slidably disposed therein and sealed with respect thereto by an O ring 72 to provide communication between the passage 68 and a tap in the peripheral surface of the housing 48.

With reference now to FIGURE 3, a system utilizing the device of FIGURES 1 and 2 is illustrated in diagrammatic-schematic form, the system incorporates a pair of opposed vertically disposed drive devices 4 and 4' having a knife 74 connected therebetween and attached to the actuator rod sections 14 and 14' by means of mounting members 76 and 76'. The devices 4 and 4' are preferably identical in structure and like components thereof are indicated by like numerals with equivalent components of devices indicated by primed numerals. A portion of the internal passages described in the description of FIGURE 1 are shown in dotted lines to clarify the connecting circuitry of FIGURE 3. The conduits are also shown, in some cases, aligned in a different direction than specifically shown in FIGURE 1, again, for purposes of clarity. The passages 26 and 26', leading to the respective drive chambers 22 and 22' are connected through conduits 78 and 80 to outlets of a multiple flow, positive-displacement pump 82. The pump shown comprises the type having a rotating wobble plate which causes pistons in the pump to reciprocate in suction and pumping strokes as is well known in the art. For purpose of illustration, the pump is of the type shown in United States Patent No. 2,941,475 to David T. Blair, but, as described in more detail in the above-referred-to Patent 3,115,751, is utilized without outlet check valves so that the solid column of fluid may move back and forth through the conduits into and out of the pumping chambers of the pump. Assuming, for example, the pump 82 incorporates six pumping pistons, the output of these pistons is divided equally so that three of the pistons in adjacent series relationship are connected to conduit 78 while the remaining three pistons are connected to conduit 80 thereby providing a synchronous and opposed force application to the devices 4 and 4' since the pistons on the suction side of the pump are sucking fluid into their cylinders while the adjacent pistons on the opposite side of the pump are, through their pumping stroke, forcing pressurized fluid from their respective cylinders. With the aforedescribed connection to the pump 82, the knife 74 is longitudinally reciprocated by opposing actuation of the drive piston segments 16 (FIGURE 1) in the devices 4 and 4' by synchronized application of pressure to one unit and reduction of pressure in the opposite unit through conduits 78 and 80. Frequency of reciprocation can be controlled by proper control of the speed of the pump 82 while amplitude of vibration is adjusted by the control of the stroke of the pistons in the pump 82 through a control device 84, a manner well-known in variable capacity pumps.

The scavenging passages 42 and 42' are connected to tanks 86 and 86' through scavenging conduits 88 and 88' to provide a drainage for oil leakage. The above-described structure and system would work satisfactorily if the knife or cutting instrument 74 were short, thick and rigid. However within the breadth of this invention, the use of elongated blades of two and three feet is contemplated. Under the pull and push arrangement described, increased efficiency is obtained through hydraulically tensioning the cutting element.

The pretensioning chambers 24 and 24' are connected, through pretensioning conduits 90 and 90' to a source of pressure which comprises a second hydraulic pump 92 and pressure accumulator 94. The hydraulic pump 92 may be of any type known in the art and is provided with means (not shown) to maintain a constant pressure in the accumulator 94 and thereby in the pretensioning chambers 24 and 24'. A crossover or interconnecting conduit 96 connects the crossover passages 29 and 29' in each of the devices to provide means to translate fluid between the pretensioning chambers 24 (FIGURE 1) as the pretensioning piston segment 18 reciprocates therein thereby maintaining a constant total system volume and thus a constant total system pressure. Thus the pretensioning pressure exerted by the fluid in each of the chambers 24 and 24' remains constant independently of the reciprocatory mode of the piston segment 18.

The pump 82 is driven, through a mechanical linkage 98, by a hydraulic motor 100 which, in turn, is driven, through a drive conduit 102, by a hydraulic pump 104. The hydraulic pump 104 is provided with means 106 to control the hydraulic output of the pump to the motor 100 and thereby control the frequency of rotation of the motor 100 and the pump 82. The hydraulic pump 104 is preferably driven at a constant speed, through a mechanical linkage, by an electric motor 108.

The piston follower chambers 50 (FIGURE 1) are connected to a scavenging pump 112 through conduits 110 and 110' for removal of leakage oil from the piston chamber very quickly. As was specifically described above, the chambers 50 (FIGURE 1) are segregated into first and second segments which are communicative with the passages 52 and 54 respectively. The segment of the chamber communicative with passages 52 and 54' are in communication with the atmosphere.

The bores 68 in the keys 60 (FIGURE 1) are connected through conduits 118 and 118' to a manifold 119 which is in parallel with conduit 123. A check valve 122 is actuated by flow-through conduit 123 from motor 100 and then into a tank 124. A needle valve 126 is arranged in parallel with the check valve 122 and connected on the tank side thereof by a conduit 128 and to the manifold 119 by a conduit 130 prior to the junction of the manifold 119 with the conduit 123.

In operation, pump 92 is actuated by drive means (not shown) and pressure is built up in the accumulator 94 to impose the desired pressure in the pretensioning chamber 24. Pump 112 is used to scavenge leakage oil from the piston follower chamber 50.

The motor 108 is then energized to actuate the pump 104 which in turn drives the motor 100 through the hydraulic interlinkage therebetween. The motor 100 drives the pump 82 through the mechanical linkage 98 so that, with the pump 82 properly set at the desired rotational rate through adjustment of the output control 106 of the pump 104 and the proper stroke through adjustment of the stroke control device 84 associated with the pump 82, the columns of fluid in conduits 79 and 80 are reciprocated thereby alternately and synchronously applying pressure to the drive chamber 22 (FIGURE 1) to reciprocate drive piston segments 16 and thereby the knife 74 at controlled amplitude and frequency.

By particular reference to FIGURE 1, it should be noted that the devices, as described, provide a "centering" tendency in that movement of the drive piston portion 16 past the intermediate scavenging pickup 32 will dump the pressure of fluid in the drive chamber 22 to tank thereby relieving the driving pressure from the piston 16 and terminating drive in that direction. As was indicated above, leakage of pressurized hydraulic fluid occurs past the inner surface of the bearing 8 to the fluid scavenging pickup 30 thereby providing lubrication for the bearing. The leakage also provides for limited controlled recirculation of the hydraulic fluid and replacement thereof in the driving circuit to prevent overheating of the driving fluid due to the high frequency reciprocation thereof.

As the drive piston portion 16 reciprocates the pretensioning piston segment 18 necessarily follows alternately increasing and decreasing the volume in the pretensioning chamber 24 (FIGURE 1). As was described above, the pump and accumulator 112 and 114 respectively, maintain a constant pressure in the chamber 24. In order to maintain constant pressure on the piston 18, and thereby constant tension on the blade 74, a constant total system volume must be provided. To accomplish this, the crossover conduit 96 provides means to reciprocate a column of fluid between the chambers 24 a distance equivalent to the total volume change in the chambers as the piston segments stroke thereby maintaining a constant total system volume and constant pressure on the piston segments 18.

What has been set forth above is intended primarily as exemplary of the embodiment incorporating teachings in accordance with the invention to enable those skilled in the art in the practice thereof. It should, therefore, be understood that within the scope of the intended claims the invention may be practiced other than as specifically described.

What is new and, therefore, desired to be protected by Letters Patent of the United States is:

1. A device for a reciprocating member comprising: first and second drive means connected to opposite ends of said member for reciprocation thereof;
    and fluid pressure means connected to each end of said member to apply constant, outwardly directed force to each end thereof and thereby maintain constant tension on said member independent of the drive and inertial forces acting thereon;
    said first and second drive means alternately operable to apply an outwardly directed force to each end of said member for pulling the member in a lineal direction.

2. A device in accordance with claim 1 wherein said fluid pressure means comprises:
    a pair of closed cylinders, a piston mounted for reciprocation in each of said cylinders, and rod means connecting each of said pistons to opposite ends of said member to reciprocate therewith;
    a common source of constant fluid pressure connected to said cylinders on the rod side of said pistons to bias said pistons outwardly and thereby apply tension to said member;
    and a crossover conduit interconnecting said cylinders on the rod side of said pistons to alternately transfer fluid displaced from one of said cylinders toward the other of said cylinders and thereby provide a constant total volume in said cylinders as said pistons reciprocate therein and thereby maintain a constant pressure in said cylinders.

3. A device in accordance with claim 1 wherein said first and second drive means comprises:
    a pair of closed cylinders, a piston mounted for reciprocation in each of said cylinders, and rod means connecting each of said pistons to opposite ends of said member;
    two sources of fluid each in communication with one of said cylinders, said sources of fluid being synchronized to alternately deliver fluid to the rod side of said pistons and draw fluid from the other side of said pistons in said cylinders to synchronously reciprocate said pistons.

4. A device in accordance with claim 3 wherein said fluid pressure means comprises:
    a second closed cylinder mounted in tandem with each of said first-mentioned cylinders, a second piston connected in tandem to each of said first-mentioned pistons and mounted for reciprocation in each of said second cylinders;
    a third source of fluid connected to said second cylinders to apply pressure thereto in outwardly opposed directions, said third source of fluid being controlled to deliver fluid to said second cylinders under constant pressure;
    a crossover conduit interconnecting said second cylinders to alternately transfer fluid from one of said second cylinders toward the other of said second cylinders to provide a constant total volume in said second cylinders as said second pistons reciprocate therein and thereby maintain a constant pressure in said second cylinders.

5. A device in accordance with claim 3 wherein said two sources of fluid pressure comprise a multi-pumping unit hydraulic pump having the output from its pumping units split into two separate fluid transmitting conduits, each of said fluid transmitting conduits being in communication with one of said first-mentioned cylinders.

6. A device in accordance with claim 4 wherein said two sources of fluid pressure comprise a multi-pumping unit hydraulic pump having the output from its pumping units split into two separate fluid transmitting conduits, each of said fluid transmitting conduits being in communication with one of said first-mentioned cylinders.

References Cited
UNITED STATES PATENTS

| | | | |
|---|---|---|---|
| 2,583,407 | 1/1952 | Binder | 60—52 XR |
| 3,115,751 | 12/1963 | McGee | 60—52 |
| 3,267,817 | 8/1966 | Adams | 92—137 XR |

EDGAR W. GEOGHEGAN, *Primary Examiner.*